United States Patent
Joshi et al.

(10) Patent No.: US 8,112,265 B2
(45) Date of Patent: Feb. 7, 2012

(54) SIMULATING LOSS OF LOGIC POWER STATE DUE TO PROCESSOR POWER CONSERVATION STATE

(75) Inventors: Maulik Joshi, Sunnyvale, CA (US); Ivan Herrera Mejia, Folsom, CA (US); Joshua D. Louie, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 12/346,956

(22) Filed: Dec. 31, 2008

(65) Prior Publication Data

US 2010/0169065 A1 Jul. 1, 2010

(51) Int. Cl.
*G06F 17/50* (2006.01)
(52) U.S. Cl. .......... 703/16; 713/323
(58) Field of Classification Search .......... 703/13–16; 716/106, 109, 133; 713/300, 320–324
See application file for complete search history.

(56) References Cited

U.S. PATENT DOCUMENTS

| | | | | |
|---|---|---|---|---|
| 5,446,906 A | * | 8/1995 | Kardach et al. | 713/323 |
| 6,836,437 B2 | * | 12/2004 | Li et al. | 365/194 |
| 7,747,878 B2 | * | 6/2010 | Vyssotski et al. | 713/300 |
| 2007/0245163 A1 | * | 10/2007 | Lu et al. | 713/300 |
| 2010/0037038 A1 | * | 2/2010 | Bieswanger et al. | 712/220 |

* cited by examiner

*Primary Examiner* — Russell Frejd
(74) *Attorney, Agent, or Firm* — Ryder, Lu, Mazzeo and Konieczny, LLC; Douglas J. Ryder

(57) ABSTRACT

In general, in one aspect, the disclosure describes creation of a randomization list that includes only a subset of the logic states of an integrated circuit (IC). The subset being selectable by signal so as to define logic states that can be randomized for specific events. The randomization list is during simulation to randomize the logic states defined therein to simulate a specific event occurring during operation of the IC. For example, the randomization list may include those signals that can be randomized upon exiting from a powered down state (e.g., deep power down, C6). The signals that can be randomized may be defined by excluding the signals that cannot be randomized (those still receiving power in the C6 mode). The contents of registers of the IC can be confirmed after the randomization and exit from the C6 mode.

18 Claims, 2 Drawing Sheets

SIMULATING LOSS OF LOGIC POWER STATE DUE TO PROCESSOR POWER CONSERVATION STATE

BACKGROUND

Power conservation is becoming increasingly important to computer platforms, whether to save battery life for mobile platforms or to meet new energy conservation standards. In order to conserve power, processors or other components of the computing platform may enter a reduced power level after a defined period of inactivity. The processors may implement various levels of reduced power consumption (known as core states or C-states) with each successive level (higher C-states) further reducing the power and being entered after additional periods of inactivity. After extended periods of inactivity a processor may enter a reduced power level (mode) where a voltage rail (Vcc) is turned off or drops below a retention level so that logic on the computing platform connected to the voltage rail is turned off (e.g., deep power down, C6). When exiting the deep power down state, the Vcc is reapplied and the logic restores the values contained therein prior to entering the deep power down mode.

BRIEF DESCRIPTION OF THE DRAWINGS

The features and advantages of the various embodiments will become apparent from the following detailed description in which.

DETAILED DESCRIPTION

Figure 1:
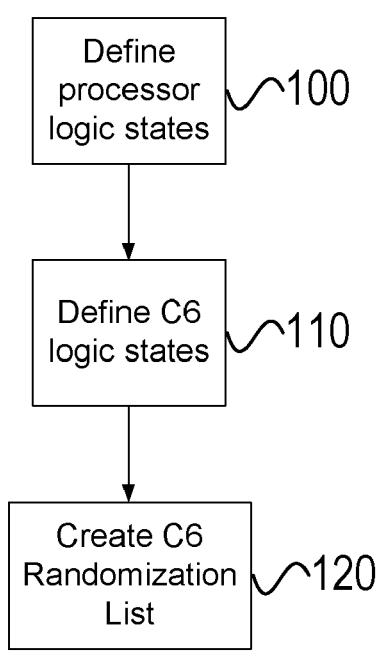
FIG. 1 illustrates an example flow chart for generating a C6 mode randomization list for use in simulating an exit from a C6 mode, according to one embodiment.

If the processor enters a reduced power mode that entails turning a power domain (Vcc) off (e.g., deep power down, C6), the power states (may simply be referred to as the states) of the logic powered down will be lost. The logic that is powered down and does not retain its state may be referred to as lost logic. Certain logic in the processor (e.g., logic controlling clocking and power states) may be powered by a separate power domain that remains on, such as Vccp that is used to power the communications with the outside world (e.g., bumps, pads, pins). The logic being powered by Vccp may be referred to as retention logic. The state of the retention logic is accordingly retained during a C6 mode (retained state).

When the processor exits the C6 mode and returns to powered operation, the processor needs to return to operation including returning the lost logic or at least a portion of the lost logic (e.g., important functions) to its pre C6 mode state. In order to return the processor to its pre C6 mode state, the processor may copy the state of the lost logic (or at least a portion thereof) to a memory means (e.g., random access memory (RAM), registers) that remains powered (e.g., by Vccp) during the C6 mode prior to the processor entering the C6 mode (pre C6 mode state). Upon returning to a powered mode (e.g., exiting the C6 mode), the lost logic may be powered up and the initial states of the lost logic may vary.

After the lost logic has been powered up, the initial state may be replaced with the recorded pre C6 mode state in the memory means. A signal (e.g., reset) may be activated to clear the initial state and copy the pre C6 mode state from the memory means to the lost logic. Regardless of the initial state of the lost logic, the lost logic needs to be capable of receiving the pre C6 mode state from the memory means and replacing the initial state with the recorded pre C6 mode state (recovering the pre C6 mode state). In order to ensure the states of the lost logic were accurately recovered (and proper operation of the processor) after returning to a powered mode, the processor may compare the pre C6 mode states in the memory means to the post C6 mode states recovered in the lost logic.

Simulations are utilized to test the operation of processors based on various operational parameters. The simulation may utilize register transfer levels (RTLs) to define the possible states of logic (state nodes) within the processor during specific actions of the processor. In order to simulate the exiting of the processor from the C6 mode, random values may need to be injected into the RTL state nodes in the middle of the simulation. Random initialization (rinit) may randomize all of the RTL state nodes within the processor. Rinit may be utilized during a power-up simulation sequence to enable simulation of the processor being powered up under any circumstances. However, rinit cannot be utilized to simulate the processor exiting a C6 mode because not all the state nodes can be randomized. The state nodes associated with the logic that remains powered on (e.g., by Vccp) may not be randomized as their state will be the current state maintained therein. Accordingly, running rinit to simulate a C6 mode exit may cause the simulation to crash if the state node of logic receiving Vccp was randomized to an unexpected value.

In order to simulate the exiting of the processor from a C6 mode, the simulation needs to be able to randomize just the logic powered by Vcc that lost its state during the processor C6 mode. In order to limit the randomization, a C6 rinit may be defined that identifies just the logic that lost its state (powered by Vcc) and thus can be a random value when exiting the C6 mode (randomized signals). The C6 rinit may be created by identifying the logic that can be randomized (e.g., powered by Vcc and lost state during C6). Alternatively, the C6 rinit may be created by identifying the logic that cannot be randomized (e.g., powered by Vccp and maintaining state during C6) and excluding these signals from the overall rinit (randomization of all signals). The signals that may not be randomized and/or the signals that can be randomized may be manually identified. For example, the list of signals that may be randomized and/or those that may not be randomized may be generated from the processor model and schematic netlist.

As the number of signals excluded from randomization is likely smaller than the number to be randomized, it may be easier to identify and exclude those signals. For example, the logic receiving Vccp during the C6 mode could be identified and excluded from the rinit when the rinit is used in a simulation to simulate the exiting of the processor from a C6 mode.

If the processor supports power-aware attributes and enables the identification and selection of logic connected to a certain voltage rail (e.g., Vcc, Vccp) the processor could create a rinit for a specific voltage rail (e.g., Vcc) or exclude a specific voltage rail (e.g., Vccp) from the overall rinit.

FIG. 1 illustrates an example flow chart for generating a C6 mode randomization list for use in simulating an exit from a C6 mode. Initially, the logic states are defined for the processor 100. The logic states for the processor may be defined in the RTL and the simulator may select logic from the RTL and apply different states to different logic to simulate different activities of the processor. The C6 logic states are then defined as a subset of the processor logic states 110. The C6 logic states may be those states that receive power (e.g., Vccp) during a C6 mode, and accordingly retain their state and are not be eligible for randomization. Alternatively, the C6 logic states may be those states that are not retained during a C6 mode, and thus can be randomized. A C6 randomization list is created based on the C6 logic states 120. If the C6 logic states are the states that cannot be randomized, the C6 randomization list is created by excluding those states from the processor logic states. Alternatively, if the C6 logic states are the states that can be randomized, the C6 randomization list is created to include the C6 logic states.

Figure 2:
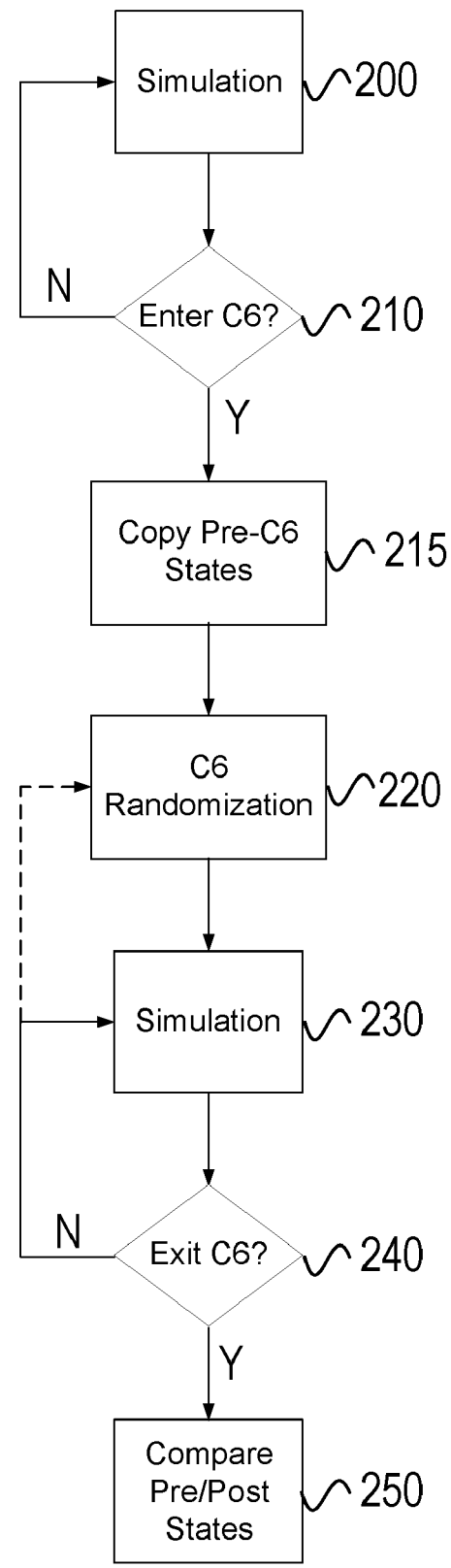
FIG. 2 illustrates an example flow chart for utilizing the C6 randomization to simulate a processor C6 mode, according to one embodiment.

FIG. 2 illustrates an example flow chart for utilizing the C6 randomization list to simulate a processor C6 mode. Initially, the simulation is being run 200. A determination may be made as to whether the processor has entered a C6 mode 210. If the processor has not entered a C6 mode 210 No, the simulation continues 200. If the processor has entered a C6 mode 210 Yes, the states of the logic (or a portion of the logic) about to be lost during the C6 mode (pre C6 mode states) are copied to a memory means 215. A C6 randomization may be initialized to randomize the states included in the C6 randomization list 220. The C6 randomization may provide random logic states to the logic that has been powered down in the C6 mode. The random logic states may be randomly selected by the simulation. Alternatively the logic states may be randomly selected by a user of the simulation. The user may select to inject all 1s or all 0s or a repeating pattern rather that randomly selecting each state.

After the C6 randomization, the simulation continues 230. A determination may be made as to whether the processor has exited the C6 mode (e.g., returned to a powered state) 240. If the processor is not exiting the C6 mode 240 No, the simulation continues 230. According to one embodiment, if the processor is not exiting the C6 mode 240 No, the C6 randomization may be processed again 220. This enables the C6 logic states to be randomized multiple times during the C6 mode. The C6 randomization 230 may be repeated while the processor remains in the C6 mode 240 No based on various parameters or conditions. If the processor has exited the C6 mode 240 Yes, the simulator may retrieve the pre C6 mode states from the memory means and copy those states to the logic (or portion thereof). In order to ensure that the pre C6 mode states were accurately recovered (and to ensure proper operation of the processor), the simulation may compare the pre C6 mode states from the memory means to the post C6 mode states that were recovered for the lost logic 250. If the states are the same, the processor is assumed to be working correctly. If the values are different, the discrepancy is flagged.

Figure 3:
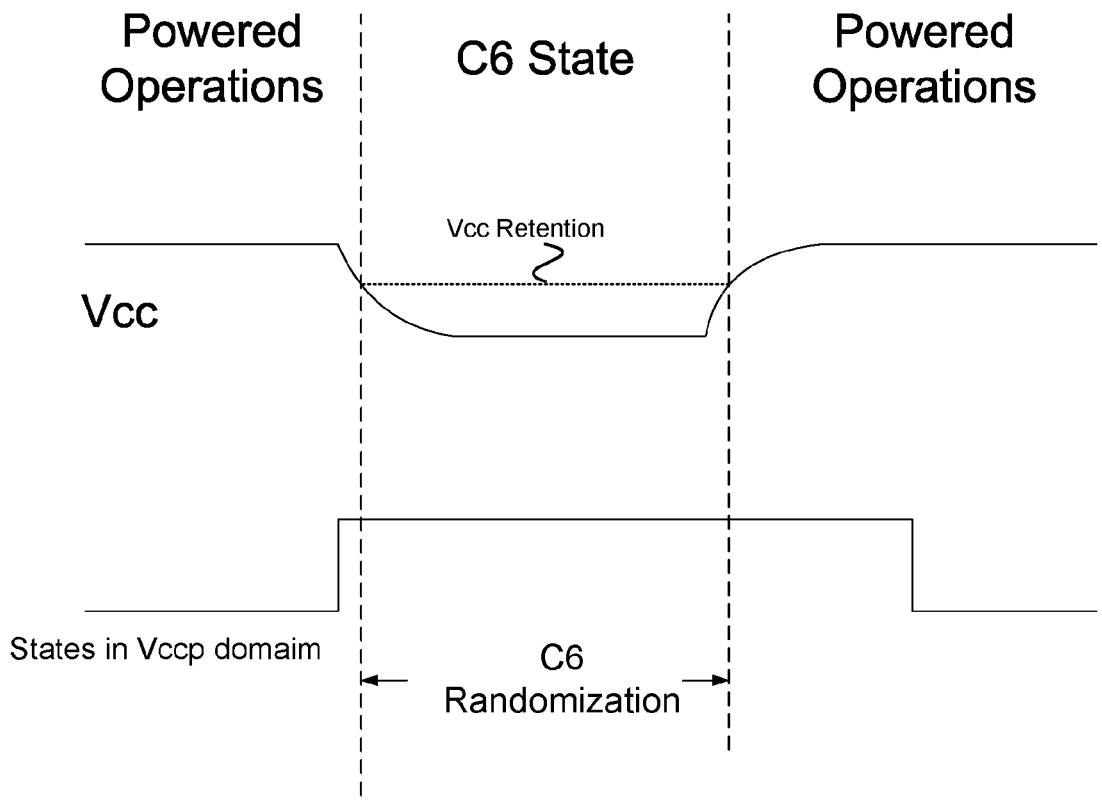
FIG. 3 illustrates an example timing diagram defining the period within which the C6 randomization may be performed, according to one embodiment.

FIG. 3 illustrates an example timing diagram defining the period within which the C6 randomization may be performed. During powered operations Vcc is on. Upon initiation of the C6 mode, the Vcc is ramped down and after the Vcc dips below a retention value the states of the logic receiving Vcc is lost. Accordingly, the states of the logic that need to be preserved from Vcc need to be transferred to the memory means (Vccp domain) prior to this point. The bottom line illustrates states being stored in the Vccp domain. While not illustrated for ease of convenience, the initiation of the C6 mode may be based on the setting of a signal or sequence of signals. When the processor determines that there is activity and it should return to the powered on state the Vcc begins to ramp up. Once the Vcc ramps past the retention value the processor exits the C6 mode and again enters the powered state.

The C6 randomization can be implemented during the C6 mode. The C6 randomization may be implemented multiple times during this period. According to one embodiment, the C6 randomization may be implemented during the Vcc ramp up, as long as Vcc is still below the retention threshold value. The states may remain stored in the Vccp domain for some time after the exit of the C6 state in order to enable the processor to restore the states so that the restored states can be compared to the recorded states.

Figure 4:
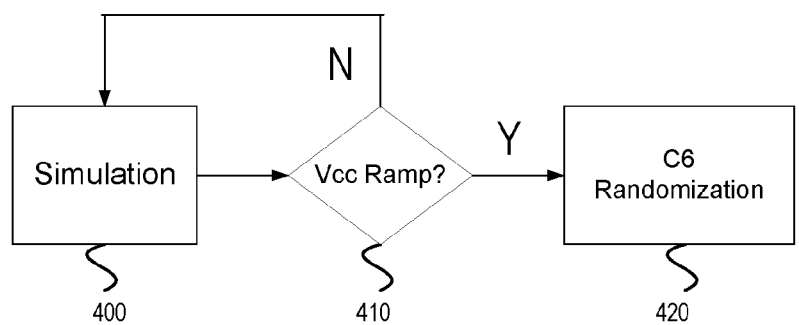
FIG. 4 illustrates an example flow chart for running a C6 randomization during a Vcc ramp, according to one embodiment.

FIG. 4 illustrates an example flow chart for running a C6 randomization during a Vcc ramp. The simulation is running during the C6 mode 400. A determination is made as to whether the Vcc is ramping up 410. If the determination is that there is no Vcc ramp 410 No, the simulation continues. If the determination is that the Vcc ramp has started 410 Yes, the C6 randomization is performed 420. While not illustrated, once the processor exits the C6 mode the registers are checked.

According to one embodiment, the C6 randomization values that are utilized in the simulation may be recorded so that errors detected in the simulation can be recreated. According to one embodiment, the simulation may be modified to focus on certain functional units or to exclude certain functional units during the simulation of the exit of the C6 mode. According to one embodiment, a user may exclude signals from the C6 randomization for any number of reasons. The signals may be excluded by updating the C6 randomization list to remove the logic.

While the disclosure focused on simulating a C6 mode of a processor and identifying the logic states that can be randomized (the logic that lost their power state) during the C6 mode, it is in no way intended to be limited thereto. Rather, the simulation may be performed for any event (e.g., power state of the processor, other state of the processor) where a subset of the logic loses its logic state during operation and the logic level selection or exclusion can be identified for the event so that an appropriate logic level randomization list is created for the occurrence.

While the disclosure focused on simulations for processors it is in no way intended to be limited thereby. Rather the simulation and the select signal level randomization utilized in the simulation can be used for any type of integrated circuit without departing from the current scope.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising
identifying an event in an integrated circuit (IC) in which a portion of logic can have their power states randomized during operation, wherein the event includes a loss of power to the portion of logic;
creating a randomization list including the logic that can have their power states randomized during the event; and
utilizing the randomization list in a simulation to simulate recovery from the event.

2. The method of claim 1, wherein the identifying includes identifying the loss of power during a power saving state of the IC.

3. The method of claim 1, wherein the creating includes identifying the logic that can not be randomized during the event and excluding the logic from a list containing all logic.

4. The method of claim 1, wherein the utilizing includes
    detecting the start of the event; and
    randomizing the power states for the logic identified in the randomization list.

5. The method of claim 4, wherein the randomizing is capable of being performed several times during the event.

6. The method of claim 4, further comprising
    detecting the end of the event; and
    determining if the IC recovered from the event.

7. A method comprising
    simulating the operation of an integrated circuit (IC);
    randomizing power states for a subset of logic of the IC to simulate possible operations during an event, wherein the subset may exclude specific logic;
    recording the randomized power states for the subset of logic; and
    determining if the IC recovered from the event.

8. The method of claim 7, further comprising detecting the start of the event, wherein the randomizing is performed after the start of the event is detected.

9. The method of claim 8, wherein the randomizing is capable of being performed several times during the event.

10. The method of claim 8, further comprising detecting the end of the event, wherein the determining is performed after the end of the event is detected.

11. A method comprising
    simulating the operation of an integrated circuit (IC) entering a power level in which a first power supply stops providing power to the IC and a second power supply provides power to a subset of the IC, wherein power states for a subset of logic not receiving power from the second power supply are lost;
    randomizing the power states for the subset of logic while the IC is at the power level; and
    determining if the IC recovered upon exiting the power level.

12. The method of claim 11, further comprising detecting initiation of power from the first power supply, wherein the randomizing is performed during the initiation of power from the first power supply.

13. The method of claim 7, wherein the randomizing is capable of being limited by functional units.

14. The method of claim 1, wherein the creating includes creating the randomization list including the logic associated with certain functional units in the IC that can have their power states randomized.

15. The method of claim 4, further comprising recording the randomized power states for the logic identified in the randomization list.

16. The method of claim 11, wherein the randomizing includes randomizing the power states for the subset of logic associated with certain functional units in the IC.

17. The method of claim 11, further comprising recording the randomized power states for the subset of logic.

18. The method of claim 11, wherein the randomizing is capable of being performed several times while the IC is at the power level.

* * * * *